No. 863,619.

PATENTED AUG. 20, 1907.

L. H. MARTELL.
PACKING.
APPLICATION FILED AUG. 20, 1906.

2 SHEETS—SHEET 1.

WITNESSES:
J. Herbert Bradley.
William H. Wilson.

INVENTOR
Louis H. Martell,
by Christy & Christy, Atty's

No. 863,619.
PATENTED AUG. 20, 1907.
L. H. MARTELL.
PACKING.
APPLICATION FILED AUG. 20, 1906.
2 SHEETS—SHEET 2.
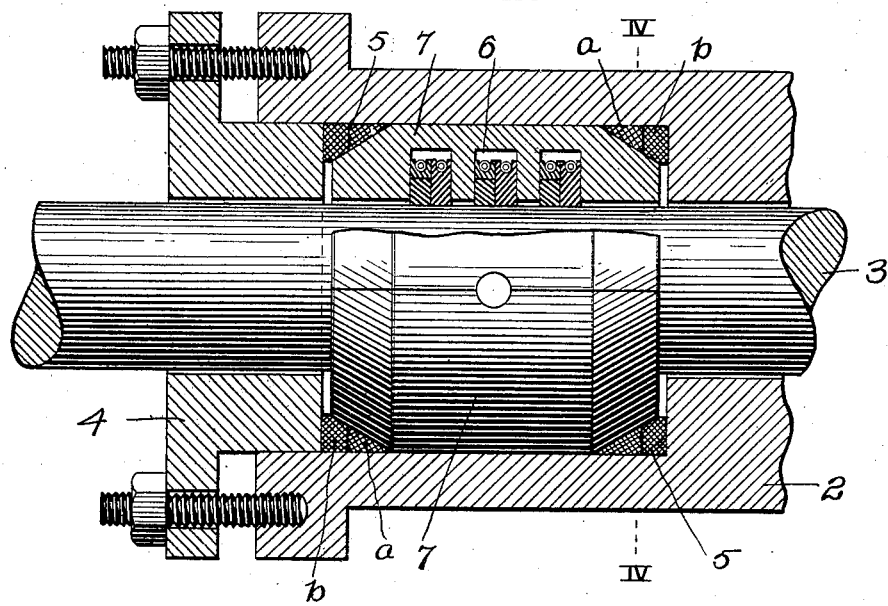
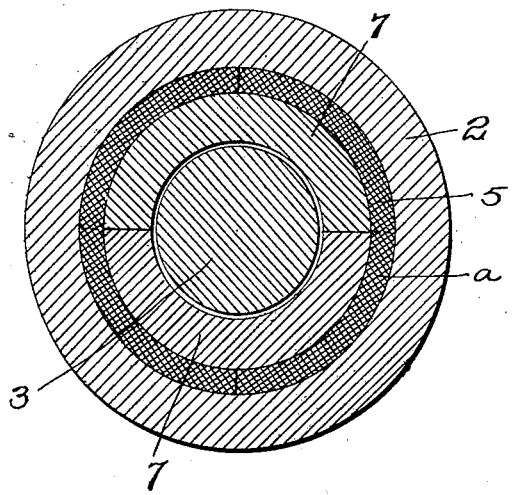

UNITED STATES PATENT OFFICE.

LOUIS H. MARTELL, OF ELLWOOD CITY, PENNSYLVANIA.

PACKING.

No. 863,619.        Specification of Letters Patent.        Patented Aug. 20, 1907.

Application filed August 20, 1906. Serial No. 331,351

To all whom it may concern:

Be it known that I, LOUIS H. MARTELL, residing at Ellwood City, in the county of Lawrence and State of Pennsylvania, a citizen of the United States, have invented or discovered certain new and useful Improvements in Packing, of which improvements the following is a specification.

The invention described herein relates to certain improvements in packings for constructions in which one mechanical part or element as a stuffing box surrounds another part or element as a piston rod which is movable back and forth relative to such first part or element and has for its object a construction in which the packing is shifted by a wedge like part or element towards the piston rod, said wedge like part or element forming a tight joint with the wall of the surrounding element, as the stuffing box.

The invention is hereinafter more fully described and claimed.

Figure 1:
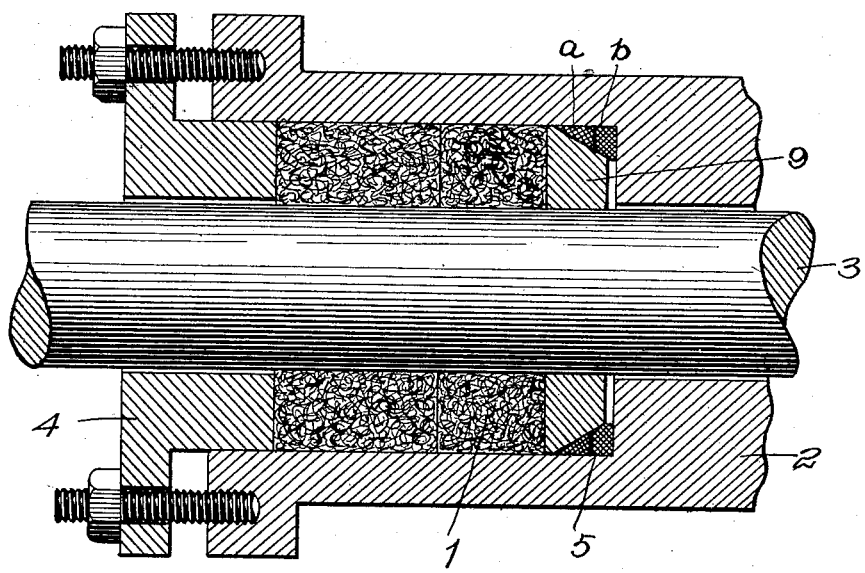
Figure 2:
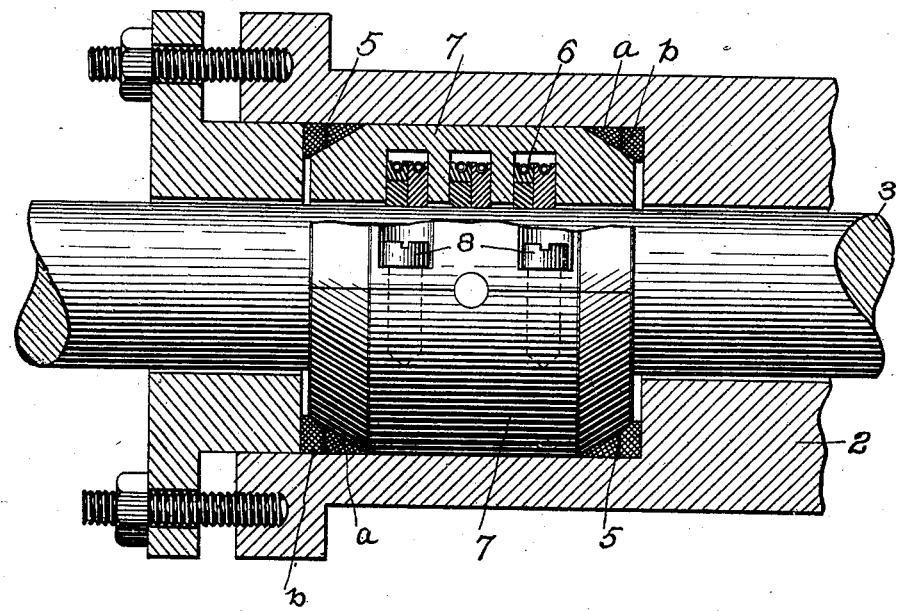

In the accompanying drawings forming a part of this specification Figure 1 is a sectional elevation of a stuffing box and rod with my improvement applied thereto. Figs. 2 and 3 are similar views illustrating modifications of my improvement and Fig. 4 is a transverse section in a plane indicated by the line IV—IV Fig. 3.

Any suitable form or construction of packing may be used with my improvement, as for example in Fig. 1 a fibrous packing 1 is shown in the stuffing box 2. This packing is held in the box and subjected to the pressure necessary to cause it to form a tight joint with the rod 3, by the adjustable gland 4.

In order to prevent any leakage of pressure between the packing and wall of the stuffing box, a wedge shaped annulus 5 is arranged at one or both ends of the main packing 1 with its apex projecting between the packing and the wall of the stuffing box. The annulus is preferably formed of sections $a$ and $b$ and each ring forming the annulus is also divided in segments for convenience in placing the annulus in position. Care should be taken that the segments of one ring should break joints with those of the other ring. The packing 1 and the annulus are arranged in the stuffing box with the broad end or base of the latter projecting beyond the packing, so that when pressure is applied to the annulus either directly as in Fig. 2 or through the packing or its carrier, the annulus will be forced outwardly forming tight joints along the straight side and base of the annulus which is preferably formed of soft metal.

My improvement can also be used in connection with a construction wherein the rod packing 6 is arranged in grooves in a rigid cage or shell 7 as shown in Figs. 2 and 3. When used with such a packing, it is preferred that an annulus should be arranged at each end of the cage or shell. The cage or shell is made in two longitudinal sections which are generally held together around the piston rod, by bolts 8 as shown in Fig. 2, but when using the wedge shaped annuli, these bolts may be omitted as the annuli will hold the sections tightly around the rod.

When my improvement is used in connection with yielding packing as in Fig. 1 it is preferred to interpose a metal ring 9 between the packing and annuli, said ring having an inclined outer face, so as to insure an expansion of the annuli against the outer wall of the stuffing box.

I claim herein as my invention:

1. A packing for piston rods having in combination a packing adapted to form a tight joint with the rod, an auxiliary metallic packing consisting of two sectional rings arranged to break joints one with the other and adapted to form a tight joint with the stuffing box, and a rigid abutment arranged between the rod packing and the auxiliary packing and having an inclined surface adapted to expand the auxiliary packing.

2. A packing for piston rods having in combination a packing forming a tight joint with the rod, a metallic packing consisting of. two sectional rings arranged to break joints one with the other, and having when arranged in operative relation a wedge-like cross section, said packing being interposed between the main or rod packing and the wall of the stuffing-box and a rigid abutment arranged between the rod packing and the auxiliary packing and having an inclined surface adapted to expand the auxiliary packing.

3. A packing for piston rods having in combination a cage or shell having an inclined beveled surface at the end, a rod packing carried by the cage or shell and an auxiliary packing consisting of sectional annuli wedge-like in cross section and arranged to break joints one with the other and interposed between the cage or shell and the wall of the stuffing-box.

In testimony whereof, I have hereunto set my hand.

LOUIS H. MARTELL.

Witnesses:
J. C. MCCORMICK, Jr.,
CHARLES BARNETT.